United States Patent
Asano

(10) Patent No.: US 6,598,969 B2
(45) Date of Patent: Jul. 29, 2003

(54) END PIECE, TEMPLE WITH END PIECE, UNIT FOR EYEGLASS FRAME AND EYEGLASSES

(75) Inventor: Hideaki Asano, Chiba (JP)

(73) Assignees: Nikon Eyewear Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 10/202,006

(22) Filed: Jul. 25, 2002

(65) Prior Publication Data

US 2003/0020866 A1 Jan. 30, 2003

(30) Foreign Application Priority Data

Jul. 26, 2001 (JP) ......................................... 2001-225411

(51) Int. Cl.⁷ ................................................. G02C 5/14
(52) U.S. Cl. ........................ 351/123; 351/117; 351/139
(58) Field of Search ................................. 351/123, 117, 351/122, 136, 139

(56) References Cited

U.S. PATENT DOCUMENTS 3,431,045 A  *  3/1969  Dietrich ...................... 351/137
3,953,114 A  *  4/1976  Bidgood ...................... 351/123
4,917,479 A  *  4/1990  Bidgood ...................... 351/123
5,007,726 A  *  4/1991  Suzuki et al. .................. 351/41
5,610,669 A  *  3/1997  Kuipers et al. ............. 351/122
5,708,491 A  *  1/1998  Onodera et al. ............ 351/122
6,388,043 B1 *  5/2002  Langer et al. ................ 528/80

FOREIGN PATENT DOCUMENTS

JP  8-15654  1/1996

* cited by examiner

*Primary Examiner*—Huy Mai
(74) *Attorney, Agent, or Firm*—Miles & Stockbridge P.C.

(57) ABSTRACT

A molded unit including several members of eyeglasses uses a combination of hard plastic and shape-memory plastic to avoid sliding and protruding of the members.

The unit frame comprises a metal core embedded in a substrate made of hard plastic of which heat deformation temperature is higher than 50 degrees centigrade, and shape-memory plastic that is disposed outside the substrate and has a glass-transition temperature of between 20 degrees centigrade and 40 degrees centigrade. The shape-memory plastic is positioned where a human body contacts.

6 Claims, 4 Drawing Sheets

END PIECE, TEMPLE WITH END PIECE, UNIT FOR EYEGLASS FRAME AND EYEGLASSES

This application claims the benefit of Japanese Patent application No. 2001-225411 which is hereby incorporated by reference.

BACKGROUND OF THE INVENTION

1. Field of the Invention

The present invention relates to eyeglasses, and more particularly, to an end piece for a temple, a temple with an end piece, and a unit for an eyeglass frame.

2. Related Background Art

An eyeglass frame has a front part for supporting lenses or being supported by lenses (i.e., the front part is supported by lenses in rimless eyeglasses), a pair of temples, and a pair of hinges for connecting the front part with a pair of temples.

An eyeglass frame also has a pair of nose pads located between left and right lenses, and a pair of end pieces to be mounted to a pair of temples. The nose pads contact a user's nose, and a pair of end pieces contact user's ears, thereby the eyeglasses being supported on user's head.

If an eyeglass temple is entirely made of metal, use of such eyeglasses makes a user feel cool and hard around his ears, giving him an unpleasant feeling. To avoid this unpleasant feeling, the temple's end (drop end) that engages with user's ear is covered with a plastic member, i.e., an end piece. The end piece was made of celluloid at first. There is a long hole in the end piece into which an end part of a metal temple is inserted. This end part of the metal temple is, hereafter, called a metal core of a temple. A diameter or size in cross section of the long hole is made a little smaller than a diameter or size in cross section of the metal core, so that the metal core is forcedly inserted into the long hall by applying force to the temple or the end piece is heated to be soften and then the metal core is inserted into the long hole.

The metal core runs through the long hole to its bottom. When the end piece is bent manually, the metal core is deformed plastically. Once the metal core has been deformed, the metal core keeps the end piece in a deformed shape, thereby the end piece being fit to a user's ear and head. This deformation is called fitting.

However, the deformation is limited to a certain amount, and the celluloid end piece gives a user a hard feeling around his or her ear. Further, when a user wears eyeglasses with the celluloid end pieces for long hours, the portion of user's skin that contacts the celluloid end piece is hurt, giving a user an unpleasant feeling and leaving a red mark on user's skin. Though, at present, celluloid is replaced with cellulose propionate plastic or cellulose acetate plastic, the above problem has been existing. Then an end piece made of shape-memory plastic has been disclosed in Japanese Patent Application Laid-Open No. 8-15654 (lines 6–7 of paragraph 0020). This Japanese Patent Application is, hereafter, called prior art.

According to this prior art, the second embodiment of the prior art discloses, in the nineteenth paragraph on page 3, that shape-memory plastic of which glass-transition temperature (Tg) is set a little lower than the body temperature is used for an end piece. Once shape-memory plastic is warmed with user's body, the end piece is softened and deformed so as to fit user's head, contacting user's head softly.

Meanwhile, nose pads also contact user's skin directly. When a user wears eyeglasses with celluloid pads for long hours, the portion of user's skin that contacts the celluloid nose pads is hurt, giving a user an unpleasant feeling and leaving a red mark on his or her skin as well as the celluloid end pieces. The prior art discloses that shape-memory plastic is used for nose pads to solve the problem.

However, such use of shape-memory plastic for end pieces and nose pads causes another problems. The first problem is that while a user is using eyeglasses with the end pieces of shape-memory plastic for a long time, a tip of the metal core breaks the bottom of the end-piece's hole and protrudes from the end piece. The second problem is caused as follows. When high heat is added to any part of a temple other than the metal core, the heat is transmitted to the metal core because the metal temple has a high heat conductivity, and then the heat softens the end piece more than necessary, so that the end piece is prone to be removed from the metal core.

Meanwhile, a nose pad is mounted to a metal frame of eyeglasses by using a nose-pad metal core that is almost covered with material of a nose pad. Using shape-memory plastic as a material for a nose pad, the same problems as those in the end piece arise. That is, (1) the first problem is that a metal core protrudes from the nose pad of shape-memory plastic. (2) The second problem is that the metal core is prone to be removed from the nose pad when high heat is conducted to the metal core.

SUMMARY OF THE INVENTION

It is an object of the present invention to provide a unit for an eyeglass frame in which a metal member covered with shape-memory plastic does not protrude from the shape-memory plastic even if eyeglasses are used for a long time.

It is further object of the present invention to provide a unit or a part for an eyeglass frame in which a metal member covered with shape-memory plastic is not removed from the shape-memory plastic even if high heat is conducted to the metal member.

The present invention can be applied to units or parts for an eyeglass frame, such as an end piece and a nose pad, which contact a user's body.

In order to achieve the above objects, according to one aspect of the present invention, there is provided a unit for an eyeglass frame comprises a metal core, an end piece substrate made of hard plastic of which heat deformation temperature is higher than 50 degrees centigrade, and an end piece cover made of shape-memory plastic of which glass transition temperature of between 20 degrees centigrade and 40 degrees centigrade, wherein, the metal core is embedded in the end piece substrate, and the end piece cover locates outside the hard plastic substrate, so that the end piece cover contacts a human body.

By using shape-memory plastic in a limited range of glass-transition temperature, i.e., between 20 degrees centigrade and 40 degrees centigrade (preferably, between 30 degrees centigrade and 35 degrees centigrade), the present invention can properly utilize a nature of shape-memory plastic. Further, by covering the metal core with the hard plastic of which heat deformation temperature is higher than 50 degrees centigrade (preferably, higher than 70 degrees centigrade), the present invention can avoid the first problem that the metal core protrudes from the end piece and the second problem that the metal core is prone to be removed from the end piece.

Furthermore, in accordance with the present invention, eyeglasses comprise a pair of eyeglass lenses, a bridge that connects the eyeglass lenses, and a pair of metal temples, wherein an end part of each of the metal temples is embedded in a substrate made of hard plastic of which heat deformation temperature is higher than 50 degrees centigrade, and shape-memory plastic of which glass-transition temperature is between 20 degrees centigrade and 40 degrees centigrade is disposed outside the substrate, the shape-memory plastic being disposed where a human body contacts.

Furthermore, in accordance with the present invention, eyeglasses comprise a pair of eyeglass lenses, a bridge that connects the eyeglass lenses, a pair of temples, a pair of nose pads, wherein each of the nose pads includes a metal core, a substrate in which the metal core is embedded and which is made of hard plastic of which heat deformation temperature is higher than 50 degrees centigrade, and shape-memory plastic of which glass-transition temperature is between 20 degrees centigrade–40 degrees centigrade is disposed outside the substrate, the shape-memory plastic being disposed where a human body contacts.

Furthermore, in accordance with the present invention, a metal temple having an end piece made of shape-memory plastic of which glass-transition temperature is between 20 degrees centigrade and 40 degrees centigrade, a part of the metal temple being used as a metal core which is inserted into the end piece, wherein the metal core is embedded in a substrate made of hard plastic of which heat deformation temperature is higher than 50 degrees centigrade, the shape-memory plastic being disposed outside the substrate.

Furthermore, in accordance with the present invention, an end piece including a substrate that is made of hard plastic of which heat deformation temperature is higher than 50 degrees centigrade and has a long hall into which a metal core of a metal temple is inserted, and shape-memory plastic that has a glass-transition temperature of between 20 degrees centigrade and 40 degrees centigrade and is disposed outside the substrate.

Furthermore, in accordance with the present invention, the hard plastic may be thermoplastic cellulose plastic.

DETAILED DESCRIPTION OF THE PREFERRED EMBODIMENTS

Figure 7:
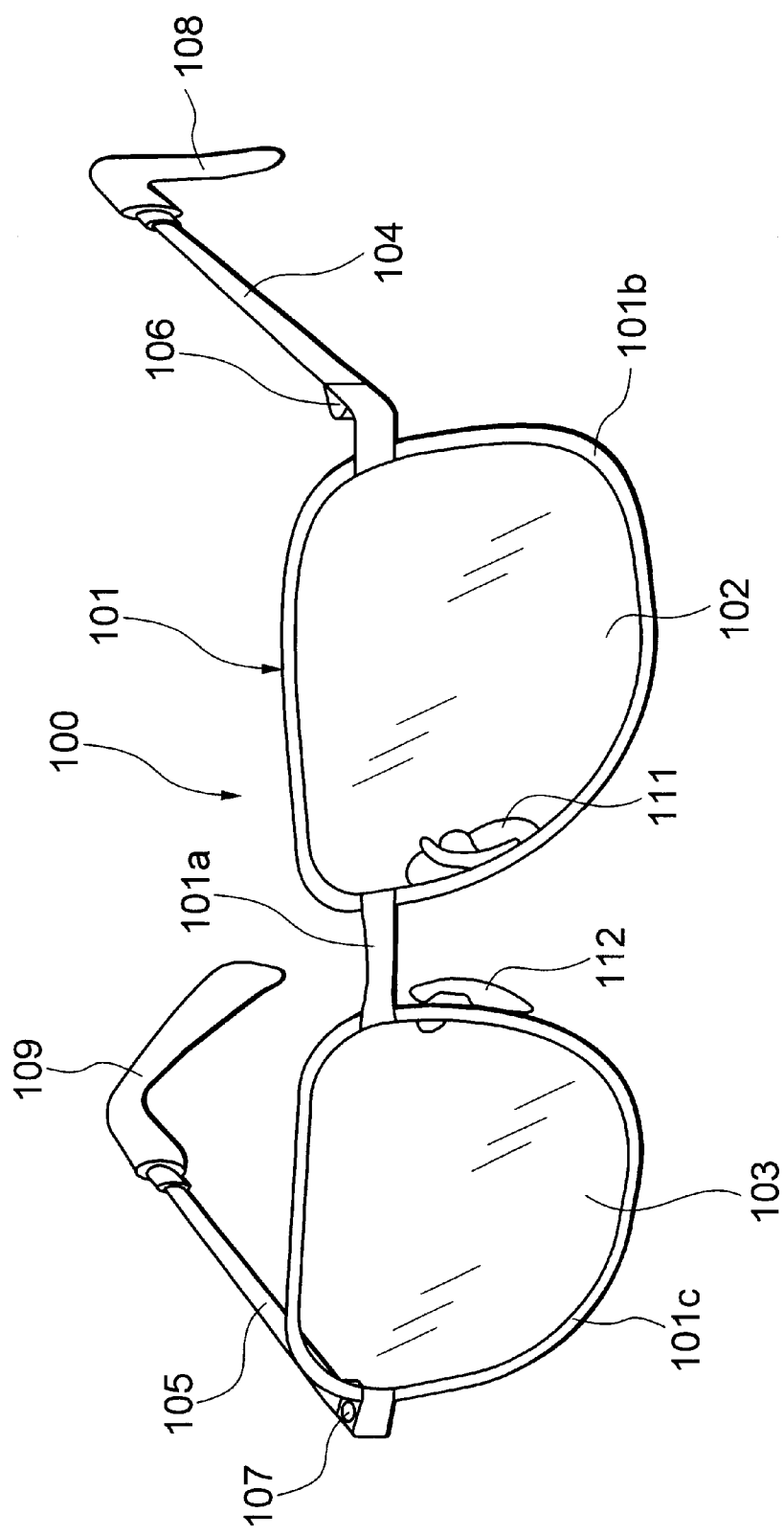
FIG. 7 is a schematic perspective view of eyeglasses having end pieces as shown in FIGS. 1 and 2 or FIGS. 5 and 6 and nose pads as shown in FIGS. 3 and 4 of the present application as an embodiment of the eyeglasses in accordance with the invention of the present application.

FIG. 7 shows a schematic perspective view of eyeglasses an embodiment of the application, in which an eyeglass frame 100 has a front part 101 which includes a bridge 101a, two rims 101b and 101c connected by the bridge 101a, two lenses 102 and 103 supported by respective rims 101b and 101c, and a pair of nose pads 111 and 112. A pair of temples 104 and 105 are connected to the front part 101 by a pair of hinges 106 and 107, respectively, which are respectively connected to the eyeglasses 102 and 103.

A pair of end pieces 108 and 109 are respectively attached to the pair of the temples 104 and 105. With respect to the pair of end pieces, description will be further made with reference to FIGS. 1 and 2 as well as FIGS. 5 and 6 hereinlater.

Figure 3:
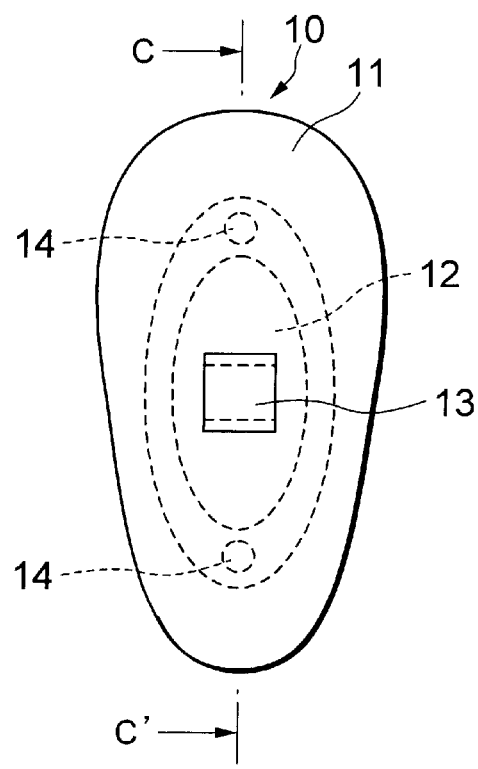
FIG. 3 is a view of a nose pad seen from the back of the nose pad.
Figure 4:
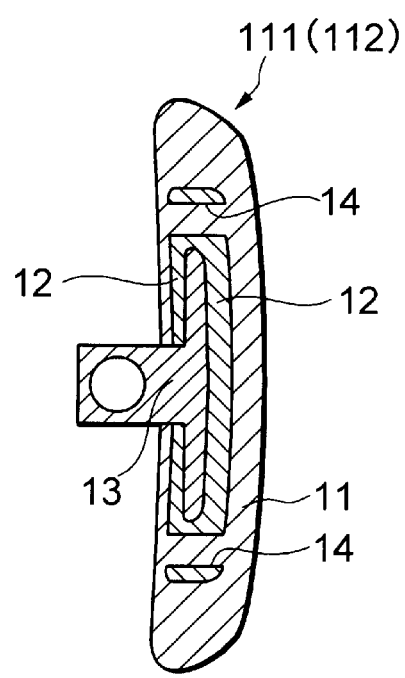
FIG. 4 is a sectional view taken along the section lines C–C' of the nose pad in FIG. 3.

The front part 101 of the eyeglass frame 100 also has nose pads 111 and 112 provided on the respective rims 101b, 101c, on which detailed description will be further made with reference to FIGS. 3 and 4.

Figure 1:
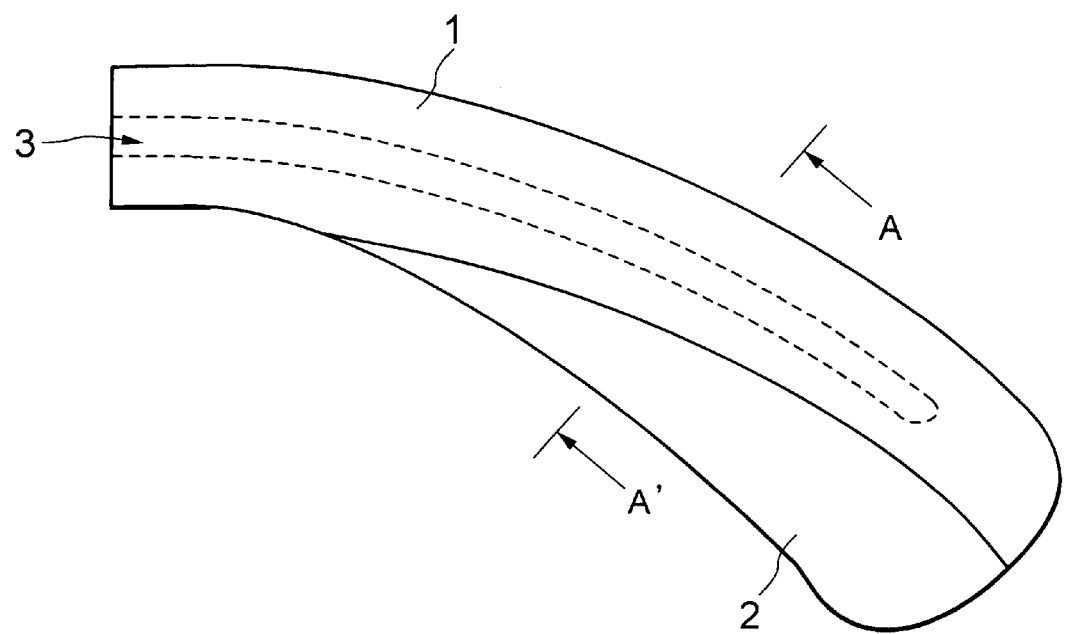
FIG. 1 is a schematic view illustrating an end piece of eyeglasses in accordance with one embodiment of the present invention.
Figure 2:
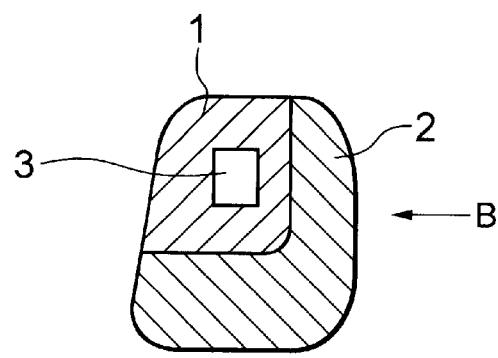
FIG. 2 is a sectional view taken along the section lines A–A' of the end piece of FIG. 1 wherein side B contacts user's head.

FIG. 1 is a schematic view illustrating an end piece of eyeglasses in accordance with one embodiment of the present invention. FIG. 2 is a sectional view taken along the section line A–A' of the end piece of FIG. 1 wherein side B contacts user's head.

Referring to FIG. 1, the end piece 108 includes end piece substrate 1 and end piece cover 2. End piece cover 2 is made of shape-memory plastic. End piece substrate 1 has long hole 3 elongated along a longitudinal direction thereof, into which a metal core of a temple is inserted. A diameter or a size in cross section of long hole 3 is a little smaller than a diameter or a size in cross section of the metal core of the temple 104 or 105 (not shown in FIGS. 1 and 2).

End piece substrate 1 is made of cellulose propionate plastic, a kind of thermoplastic cellulose plastic, of which heat deformation temperature is about 80 degrees centigrade. Since the cellulose propionate plastic is relatively hard, the first problem that a metal core protrudes from an end piece does not occur. Even if high heat added to another part of the temple is transmitted to the metal core, the high heat is not transmitted to end piece cover 2 of shape-memory plastic because the end piece substrate 1 has heat insulating properties. Therefore, shape-memory plastic is not softened so much that the second problem that the end piece is prone to be removed from the temple does not occur.

End piece substrate 1 does not always need to be made of thermoplastic cellulose plastic (such as celluloid, cellulose acetate, cellulose propionate, or cellulose butyrate), but may be made of any plastic harder than shape-memory plastic and higher than 50 degrees centigrade in heat deformation temperature. For example, aliphatic polyamides such as 6-nylon, 6.6-nylon, and 12-nylon, polyolefins such as aromatic polyamide, ABS, AS, polyethylene (high or low density), polystyrene, and polypropylene, saturated polyesters such as polyvinyl chloride, polyvinylidene chloride, ethylene- polyvinyl acetate copolymer, polyvinyl alcohol, polyacetal, polycarbonate, polyethylene terephthalate, and polybutylene terephthalate, thermoplastics such as aromatic polyester, polyether ketone, polyether ether ketone, polysulfone, polyether sulfone, polyether imide, polyallylate, polymethyl pentene, ionomer, liquid crystal polymer, polyimide, polyamide imide, fluorocarbon polymers, polyphenylene sulfide, and polyphenylene oxide (denaturation, or invariance), and thermosetting plastics such as epoxy plastic, unsaturated polyester, polyurethane, and polyimide are usable. The heat deformation temperatures of these plastics are within 300 degrees centigrade.

Glass-transition temperature of shape-memory plastic of end piece cover 2 needs to be between 20 degrees centigrade–40 degrees centigrade, preferably, it needs to be between 30 degrees centigrade–35 degrees centigrade. In the present embodiment, shape-memory plastics of glass-transition temperatures of 25 degrees centigrade, 30 degrees centigrade, and 35 degrees centigrade are used. End piece cover 2 of shape-memory plastic is softened with user's body heat and is plastically deformed to fit user's ear and head. Since the fitting is plastic deformation, end piece cover 2 of shape-memory plastic does not have an elastic reactive force, so that a user has a good feeling. And since a surface of end piece cover 2 is smooth, a user has also a good feeling. Since such shape-memory plastics are sold as products that have any glass-transition temperatures differing every 5 degrees centigrade, they are easily obtained. For example, polyurethane plastic product "Da-i-a-ri" is sold from Mitsubishi Heavy Industries Ltd., and a polyurethane plastic product "Diaplex" is sold from DIAPLEX Co., Ltd.

End piece substrate 1 and end piece cover 2 can be easily formed by conventional forming processes such as cutting, injection molding, cast molding, and press molding. End piece substrate 1 and end piece cover 2 are joined by using adhesive, heat welding or mechanical engagement. Both can be also combined by performing an insert-molding process in which end piece cover 2 is molded in contact with end piece substrate 1, which is already molded, in a molding cavity, resulting in a combined end piece. Thus the end piece is formed. Then the formed end piece and a temple are combined by inserting a temple into the end piece manually.

Another way to combine an end piece and a temple is that a temple is first embedded in end piece substrate 1 by performing an insert-molding process in which end piece substrate 1 is molded so as to include the temple that is placed in a cavity of a die in advance, and then end piece cover 2 is combined with the combination of end piece substrate 1 and the temple by performing an insert-molding. In this case, since a metal core is placed in a die in advance, end piece substrate 1 can be easily kept in a proper position in the molding cavity.

In the embodiment of the present invention, shooting-molding process, a kind of insert-molding process, is used. The shooting-molding process is performed as follows. First, pulp-state plastic substance is put into a cavity of a die of end piece substrate 1. Then the plastic substance in the die gets harder gradually from a pulp state to a solid state. In this process, there is a time of period in which an outer part of end piece substrate 1 is hard but an inner part of it is still in a pulp state. At this time, a metal core, i.e., an end part of a temple, is shot into end piece substrate 1. When whole end piece substrate 1 has got solid, end piece substrate 1 is firmly combined with a temple. Next, by performing an insert-molding process, this end piece substrate 1 with an embedded temple is combined with end piece cover 2.

A molded end piece sometimes has a bad surface or appearance. So the molded end piece may be finished by polishing or surface treatment. For example, by coating protein-type plastic on the surface of an end piece, affinity between the human skin and the end piece can be increased. Further, by coating silicon plastic of water repellency on the surface of an end piece, waterproof and sliding characteristics of the end piece can be improved.

The temple 104, 105 is made of metal. The temple has a metal core portion, i.e., an end part of the temple, which is 50–70 mm in length (in the present embodiment, the length is 61 mm). A cross section of the metal core may be a square, a rectangle (FIG. 2), a circle, an ellipse, or a non-circle. The metal core may have serration or a small through-hall to avoid sliding between the metal core and end piece substrate 1. The metal core also may receive a surface treatment (using silane coupling agent) to improve adhesion properties between the metal core and end piece substrate 1. The temple may be hollow to decrease its weight.

Materials for the temple may be, for example, nickel silver, nickel alloy, cobalt alloy, aluminum alloy, beryllium alloy, other copper alloys, zinc alloy, chromium alloy, stainless steel, spring steel, gold, gold alloy, silver, silver alloy, super elasticity alloy (NT alloy), titanium, beta-titanium, and titanium alloy.

The temple may receive surface treatments such as plating and painting.

Further, a temple can be combined with an end piece by inserting the temple into an end piece manually. In this case, the end piece is heated a little in advance to be softened.

Then a pair of hinges 106, 107 are mounted to a pair of temples 104, 105 by brazing. Next, the pair of temples 104, 105 are mounted to the front part 101 of an eyeglass frame 100 that has counterparts of the hinges with screws.

Figure 5:
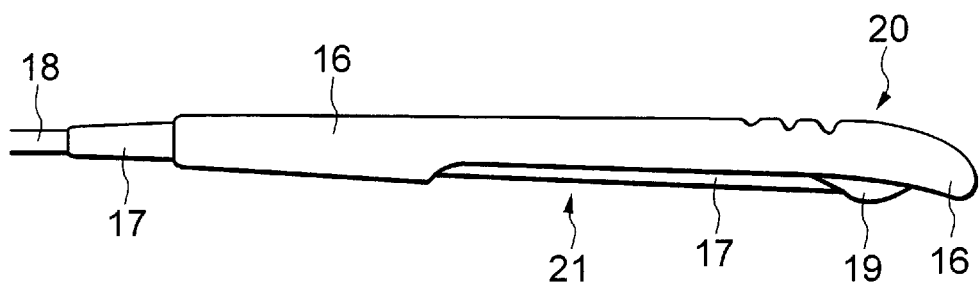
FIG. 5 is a plan view illustrating an end piece of eyeglasses in accordance with another embodiment of the present invention, in a state where the eyeglasses are worn.
Figure 6:
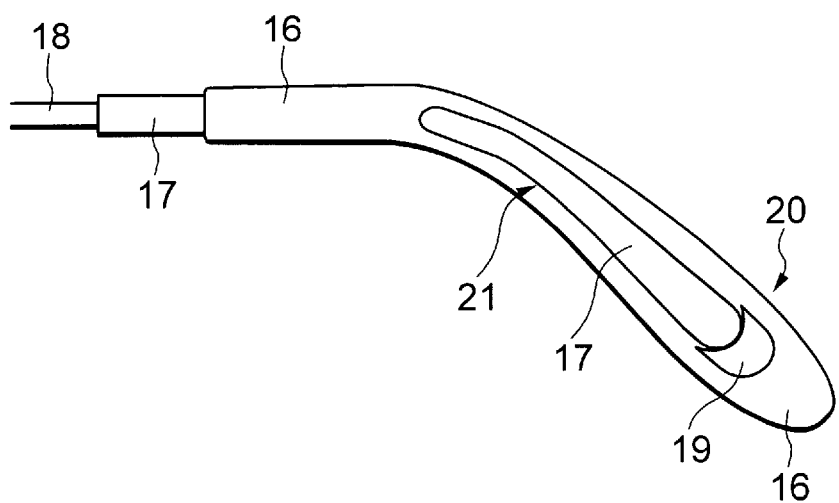
FIG. 6 is a side view of the same end piece and in the same state as illustrated in FIG. 7.

FIGS. 5 and 6 show a modification of an end piece of the present invention. FIG. 5 is a plan view of the modified end piece in the state where the eyeglasses adopting the modified end pieces are worn, and FIG. 6 is a side view of the same end piece in the same state.

In FIGS. 5 and 6, an end piece substrate 17 is formed with a long hole extended a long its lengthwise direction, in which a metal core 18 of the temple 104 is inserted. A tip end 20 of the metal core 18 is located at a position 20 shown in FIGS. 5 and 6 and is completely covered by the end piece substrate 17. The end piece substrate 17 is made of cellulose propionate.

Almost of outer surface of the end piece substrate 17 is covered by an end piece cover 16 made of a same or similar shape memory plastic as or to that of the end piece cover shown in FIGS. 1 and 2. An outside portion of the end piece cover 16, contacting no head or body of the wearer is formed with an elongated opening 21 so that a portion of the end piece substrate 17 is exposed through the opening 21. A thickness of the end piece cover 16 is made larger at a portion 19 thereof around the tip end 20 of the metal core.

The modified end piece is so prepared as follows: First, the end piece substrate 17 is formed and then the end piece cover 16 is formed, thereby preparing plastic end piece as a combination of the end piece substrate and the end piece cover. Then, the metal core 18 of the temple is inserted into the elongated hole in the end piece substrate 18, thereafter, the end piece being bent in its entirety to have a shape as desired.

FIG. 3 is a view of a nose pad seen from the back of the nose pad 111 or 112. FIG. 4 is a sectional view taken along the section line C–C' of the nose pad in FIG. 3. Nose pad metal core 13 made of brass is almost covered with nose pad substrate 12 that is made of cellulose propionate of which heat deformation temperature is about 80 degrees centigrade. And nose pad substrate 12 is covered with nose pad body 11 that is made of shape-memory plastic that has glass-transition temperatures of 20 degrees centigrade–40 degrees centigrade. In the present embodiment, the shape-memory plastic is polyurethane plastic "Diaplex" sold from DIAPLEX Co., Ltd.

It is preferable that there is good adhesion property between hard plastic of nose pad substrate 12 and shape-memory plastic of nose pad body 11. Nose pad substrate 12 may have holes to avoid sliding between nose pad substrate 12 and nose pad piece 11 by filling the holes with shape-memory plastic. Nose pad substrate 12 also may have protrusions instead of holes.

Referring to FIGS. 3 and 4, nose pad 111 (or 112) is made using an insert-molding process as follows. First, nose pad substrate 12 is molded so as to include nose pad metal core 13 by pouring cellulose propionate into a die in which nose pad metal core 13 has been already disposed, resulting in a combination unit of nose pad substrate 12 and nose pad metal core 13. Then nose pad body 11 is molded so as to include this combination unit. Then polyurethane-shape-memory plastic is poured into a die in which the combination unit has been already disposed, thereby resulting in nose pad 111 (or 112).

This nose pad 111 (112) does not have the first problem that nose pad metal core 13 protrudes from nose pad piece 11. Further this nose pad 111 (112) does not have the second problem because heat is not transmitted to nose pad body 11 of shape-memory plastic due to heat insulating properties of nose pad substrate 12. Therefore nose pad metal core 13 is not removed from nose pad body 11.

The present invention has been described with respect the first embodiment of a full-rim type frame, but the present invention should not be limited to the full-rim type frame and applicable to a rimless type or any other type of eyeglass frame.

What is claimed is:

1. A unit for an eyeglass frame comprising:

a metal core;

an end piece substrate made of hard plastic of which heat deformation temperature is higher than 50 degrees centigrade; and an end piece cover made of shape-memory plastic of which glass transition temperature of between 20 degrees centigrade and 40 degrees centigrade, wherein, the metal core is embedded in the end piece substrate, and the end piece cover locates outside the hard plastic substrate, so that the end piece cover contacts a human body.

2. Eyeglasses comprising:

a pair of eyeglass lenses;

a bridge that connects the eyeglass lenses; and a pair of metal temples;

wherein an end part of each of the metal temples is embedded in a substrate made of hard plastic of which heat deformation temperature is higher than 50 degrees centigrade, and shape-memory plastic of which glass-transition temperature is between 20 degrees centigrade and 40 degrees centigrade is disposed outside the substrate, the shape-memory plastic being disposed where a human body contacts.

3. Eyeglasses comprising:

a pair of eyeglass lenses;

a bridge that connects the eyeglass lenses;

a pair of temples;

a pair of nose pads, wherein each of the nose pads includes a metal core, a substrate in which the metal core is embedded and which is made of hard plastic of which heat deformation temperature is higher than 50 degrees centigrade, and shape-memory plastic of which glass-transition temperature is between 20 degrees centigrade and 40 degrees centigrade is disposed outside the substrate, the shape-memory plastic being disposed where a human body contacts.

4. A metal temple having an end piece made of shape-memory plastic of which glass-transition temperature is between 20 degrees centigrade and 40 degrees centigrade, a part of the metal temple being used as a metal core which is inserted into the end piece, wherein the metal core is embedded in a substrate made of hard plastic of which heat deformation temperature is higher than 50 degrees centigrade, the shape-memory plastic being disposed outside the substrate.

5. An end piece including a substrate that is made of hard plastic of which heat deformation temperature is higher than 50 degrees centigrade and has a long hall into which a metal core of a metal temple is inserted, and shape-memory plastic that has a glass-transition temperature of between 20 degrees centigrade and 40 degrees centigrade and is disposed outside the substrate.

6. An end piece according to claim 5, wherein the hard plastic is thermoplastic cellulose plastic.

\* \* \* \* \*